US012663918B2

(12) United States Patent
Masujima

(10) Patent No.: US 12,663,918 B2
(45) Date of Patent: Jun. 23, 2026

(54) PRINTING SYSTEM, PRINTED MATTER PRODUCTION METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Ikuo Masujima, Asahi-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 244 days.

(21) Appl. No.: 18/425,177

(22) Filed: Jan. 29, 2024

(65) Prior Publication Data

US 2024/0256116 A1     Aug. 1, 2024

(30) Foreign Application Priority Data

Jan. 30, 2023     (JP) ................................. 2023-011624

(51) Int. Cl.
*G06F 3/0485* (2022.01)
*G06F 3/0488* (2022.01)
*H04N 1/00* (2006.01)

(52) U.S. Cl.
CPC .......... *G06F 3/0485* (2013.01); *G06F 3/0488* (2013.01); *H04N 1/00411* (2013.01); *H04N 1/00432* (2013.01)

(58) Field of Classification Search
CPC .................................................... G06F 3/0485
USPC ........................................................ 715/784
See application file for complete search history.

(56) References Cited

U.S. PATENT DOCUMENTS

| | | | | |
|---|---|---|---|---|
| 10,063,724 B2* | 8/2018 | Fujii | ................... | H04N 1/00506 |
| 10,678,424 B2* | 6/2020 | Han | ...................... | G06F 3/0488 |
| 11,659,109 B2* | 5/2023 | Takase | .............. | H04N 1/00411 |
| | | | | 358/442 |
| 12,034,892 B2* | 7/2024 | Mishima | .............. | H04N 1/0035 |
| 2011/0199639 A1* | 8/2011 | Tani | .................... | G06F 3/04886 |
| | | | | 345/173 |
| 2014/0026101 A1* | 1/2014 | Pallakoff | ............... | G06F 3/0483 |
| | | | | 715/841 |
| 2016/0086571 A1* | 3/2016 | Aoki | ................... | G06F 3/04847 |
| | | | | 345/593 |
| 2016/0283172 A1* | 9/2016 | Wang | ................... | G06K 15/005 |
| 2017/0329495 A1* | 11/2017 | Feiereisen | ............. | G06F 3/0482 |
| 2018/0272526 A1* | 9/2018 | Nagashima | .......... | G05B 19/423 |
| 2019/0360178 A1* | 11/2019 | Morimoto | ................ | G05G 1/01 |
| 2020/0249829 A1* | 8/2020 | Kim | ....................... | G06F 3/0488 |
| 2021/0306490 A1* | 9/2021 | Mizuno | .............. | H04N 1/00411 |
| 2022/0057989 A1* | 2/2022 | Watanabe | ............. | G06F 3/0485 |
| 2022/0164094 A1* | 5/2022 | Hyytiäinen | .......... | G06F 3/0482 |

(Continued)

FOREIGN PATENT DOCUMENTS

JP          2021164057 A     10/2021

*Primary Examiner* — Reza Nabi

(74) *Attorney, Agent, or Firm* — CHIP LAW GROUP

(57) ABSTRACT

A printing system according to one aspect of the present disclosure includes a touch panel display and a printing mechanism that performs printing according to a print setting configured using the touch panel display. The touch panel display is configured to selectively display a plurality of print setting sets in which a plurality of setting items are arranged in a vertical direction, and setting values corresponding to the plurality of setting items are arranged at respective positions in a horizontal direction with respect to the plurality of setting items.

8 Claims, 9 Drawing Sheets

(56)           References Cited

U.S. PATENT DOCUMENTS

| 2023/0244358 | A1* | 8/2023 | Suzuki ................. | G06F 3/0482 |
| | | | | 715/810 |
| 2024/0044974 | A1* | 2/2024 | Onuma .............. | G01R 31/3171 |
| 2024/0045778 | A1* | 2/2024 | Onuma .............. | G06F 11/2733 |
| 2024/0256116 | A1* | 8/2024 | Masujima .......... | H04N 1/00432 |

* cited by examiner

PRINTING SYSTEM, PRINTED MATTER PRODUCTION METHOD, AND NON-TRANSITORY COMPUTER-READABLE STORAGE MEDIUM STORING PROGRAM

The present application is based on, and claims priority from JP Application Serial Number 2023-011624, filed Jan. 30, 2023, the disclosure of which is hereby incorporated by reference herein in its entirety.

BACKGROUND

1. Technical Field

The present disclosure relates to a printing system, a printed matter production method, and a non-transitory computer-readable storage medium storing a program.

2. Related Art

In recent years, a printing system in which a print setting is configured by operating a touch panel display has been widely used. For example, a user can operate a smartphone to configure a print setting and transmit information regarding the print setting to a printer, so that the printer can perform printing according to the print setting. JP-A-2021-164057 discloses a technology related to an image processing device including a display.

When configuring a setting by operating a touch panel display, the setting is configured by operating a setting set in which a plurality of setting items and setting values corresponding to the plurality of setting items are arranged. However, when there are a plurality of setting sets, an operation at the time of configuring a setting becomes complicated, which is problematic.

SUMMARY

According to an aspect of the present disclosure, a printing system includes a touch panel display and a printing mechanism that performs printing according to a print setting configured using the touch panel display. The touch panel display is configured to selectively display a plurality of print setting sets in which a plurality of setting items are arranged in a first direction, and setting values corresponding to the plurality of setting items are arranged at respective positions in a second direction intersecting the first direction with respect to the plurality of setting items, the print setting set is scrolled in the first direction and displayed in response to reception of a swipe operation made in the first direction by a user, the plurality of print setting sets are switched and the switched print setting set is displayed in response to reception of a swipe operation made in the second direction by the user. The printing mechanism performs printing based on the print setting set displayed on the touch panel display when a printing start instruction is received from the user.

According to an aspect of the present disclosure, a printed matter production method of producing printed matter by performing printing according to a print setting configured using a touch panel display includes: selectively displaying, on the touch panel display, a plurality of print setting sets in which a plurality of setting items are arranged in a first direction, and setting values corresponding to the plurality of setting items are arranged at respective positions in a second direction intersecting the first direction with respect to the plurality of setting items; scrolling the print setting set in the first direction and displaying the scrolled print setting set on the touch panel display in response to reception of a swipe operation made in the first direction by a user; switching the plurality of print setting sets and displaying the switched print setting set on the touch panel display in response to reception of a swipe operation made in the second direction by the user; and causing a printing mechanism to perform printing based on the print setting set displayed on the touch panel display when a printing start instruction is received from the user to produce the printed matter.

According to an aspect of the present disclosure, a non-transitory computer-readable storage medium stores a program for causing a computer to implement: a display function that displays an operation screen on a display device; an input function that receives a user operation; and a processing function that executes processing according to an operation received via the operation screen, in which a plurality of setting sets in which a plurality of setting items are arranged in a first direction, and setting values corresponding to the plurality of setting items are arranged at respective positions in a second direction intersecting the first direction with respect to the plurality of setting items are selectively displayed on the operation screen, the setting set is scrolled in the first direction and displayed in response to reception of a swipe operation made in the first direction by a user, the plurality of setting sets are switched and the switched setting set is displayed in response to reception of a swipe operation made in the second direction by the user, the plurality of setting sets are switched and the switched setting set is displayed in response to reception of a tap operation made in the second direction by the user, and the setting set displayed on the operation screen is displayed differently depending on whether the swipe operation in the second direction or the tap operation in the second direction is performed.

DESCRIPTION OF EMBODIMENTS

Figure 1:
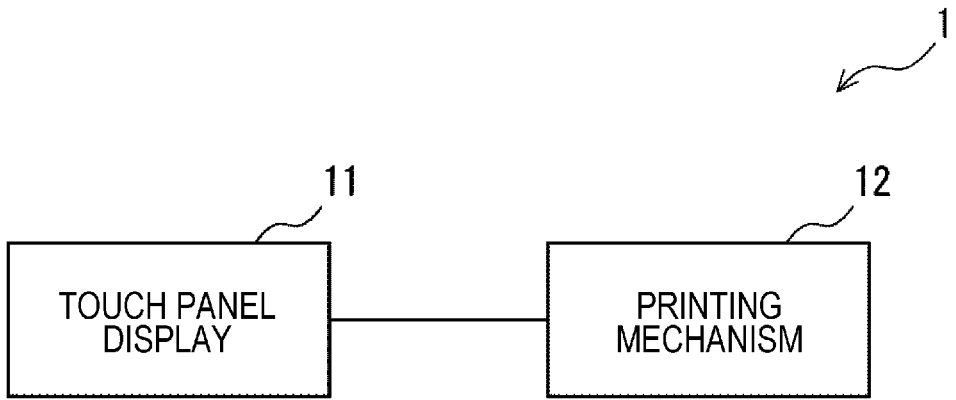
FIG. 1 is a block diagram illustrating an example of a printing system according to an embodiment.

Embodiments of the present disclosure will be described below with reference to the drawings. FIG. 1 is a block diagram illustrating an example of a printing system according to an embodiment. As illustrated in FIG. 1, a printing system 1 according to the present embodiment includes a touch panel display 11 and a printing mechanism 12. The printing system 1 according to the present embodiment is a system in which the printing mechanism 12 performs printing according to a print setting configured by a user operating the touch panel display 11. In the present embodiment, printed matter can be produced by performing printing using the printing system 1 illustrated in FIG. 1.

The touch panel display 11 can be configured using a display panel and a touch panel overlapping the display panel. The display panel can be configured using a liquid crystal panel, an organic electroluminescence (EL) panel, or the like. The touch panel can be configured using a resistive film type touch panel, a capacitive touch panel, a surface acoustic wave type touch panel, an optical touch panel, or the like. The user can input predetermined information by operating the touch panel display 11 with a finger or a stylus pen while viewing a user interface (UI) displayed on the touch panel display 11.

The touch panel display 11 is controlled by a control unit (not illustrated). Specifically, the control unit supplies image data to be displayed on the touch panel display 11 to the touch panel display 11. Further, information regarding a user operation detected on the touch panel display 11 is supplied to the control unit. The control unit detects a tap operation, a swipe operation, a flick operation, or the like based on information regarding the user operation supplied from the touch panel display 11. For example, the control unit can be configured using a processor and a memory.

The printing mechanism 12 is a device that performs printing on a print medium by using a printing method such as an ink jet method or an electrophotographic method. For example, when the printing mechanism 12 is an ink jet type printing unit, the printing mechanism 12 includes a print head that ejects ink, a motor that transports the print head, an encoder that detects a rotation angle of the motor and a position of the print head, and a feeding mechanism.

In the present embodiment, the touch panel display 11 is, for example, a touch panel display included in a smartphone. In this case, information regarding the print setting configured by the user operating the touch panel display 11 is wirelessly transmitted to the printing mechanism 12. That is, a communication unit included in the smartphone wirelessly transmits the information regarding the print setting to a communication unit included in the printing mechanism 12. The printing mechanism 12 performs printing based on the received information regarding the print setting. The printing system 1 according to the present embodiment may have a configuration in which the touch panel display 11 is attached to the printing mechanism 12. Furthermore, the touch panel display 11 and the printing mechanism 12 may be coupled to each other by a wire.

Figure 2:
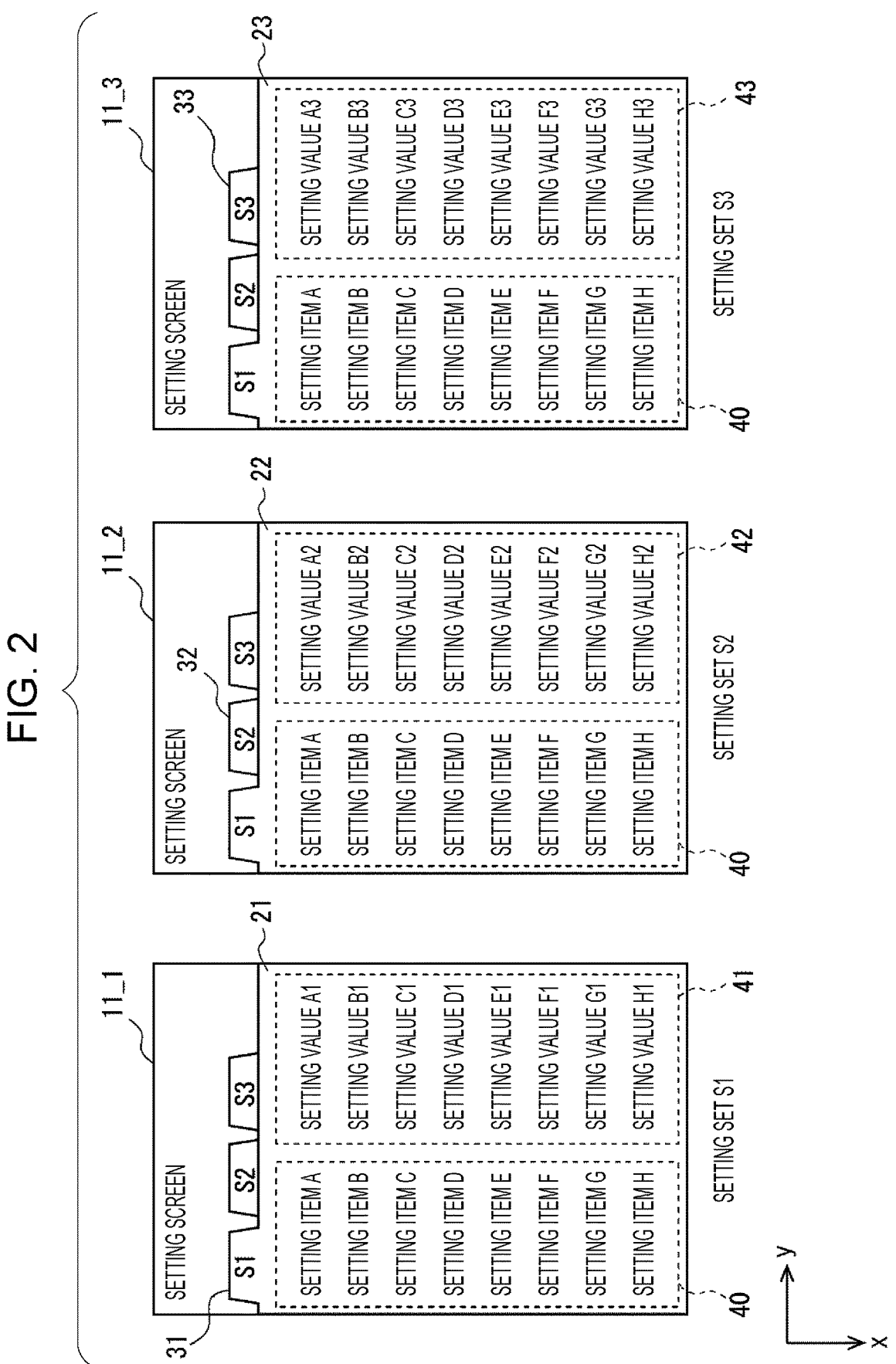
FIG. 2 is a diagram illustrating an example of a setting screen of the printing system according to an embodiment.

Next, a setting screen displayed on the touch panel display 11 will be described. FIG. 2 is a diagram illustrating an example of the setting screen of the printing system according to the present embodiment. As illustrated in FIG. 2, touch panel displays 11_1 to 11_3 are configured to selectively display a plurality of print setting sets S1 to S3. The print setting set is simply referred to as a "setting set" below. Further, the touch panel displays 11_1 to 11_3 are collectively referred to as the touch panel display 11.

In the setting set S1 (21) displayed on the touch panel display 11_1, a plurality of setting items 40 are arranged in an x-axis direction (first direction), and setting values 41 corresponding to the plurality of setting items 40 are arranged at respective positions in a y-axis direction (second direction) with respect to the setting items 40. For example, the x-axis direction is a longitudinal direction of the touch panel display 11, and the y-axis direction is a lateral direction of the touch panel display 11.

Similarly, in the setting set S2 (22) displayed on the touch panel display 11_2, the plurality of setting items 40 are arranged in the x-axis direction, and setting values 42 corresponding to the plurality of setting items 40 are arranged at respective positions in the y-axis direction with respect to the plurality of setting items 40. Similarly, in the setting set S3 (23) displayed on the touch panel display 11_3, the plurality of setting items 40 are arranged in the x-axis direction, and setting values 43 corresponding to the plurality of setting items 40 are arranged at respective positions in the y-axis direction with respect to the plurality of setting items 40. Tabs 31 to 33 are provided for the setting sets S1 to S3, respectively. Note that a shape other than a tab may be used, as long as the shape is a button that can be selected by the user by tapping.

In the present embodiment, the plurality of setting sets S1 to S3 can be selectively displayed on the touch panel display 11. Here, the setting sets S1 to S3 have common setting items 40. Furthermore, different setting values 41 to 43 can be set for the setting sets S1 to S3, respectively. Therefore, the user can set different setting values 41 to 43 for the setting sets S1 to S3. For example, the setting values of the setting sets S1 to S3 may be set according to the purpose of printing, such as photo printing or document printing. For example, the user can quickly and easily configure a print setting according to the printing purpose by setting and storing the setting values 41 to 43 of the setting sets S1 to S3 in advance according to the printing purpose.

For example, the user can switch between screens of the plurality of setting sets S1 to S3 by swiping the screen in the y-axis direction. Further, the user can selectively display a setting set that the user wants to display by tapping the tab 31, 32, or 33 of the setting set that the user wants to display.

Figure 3:
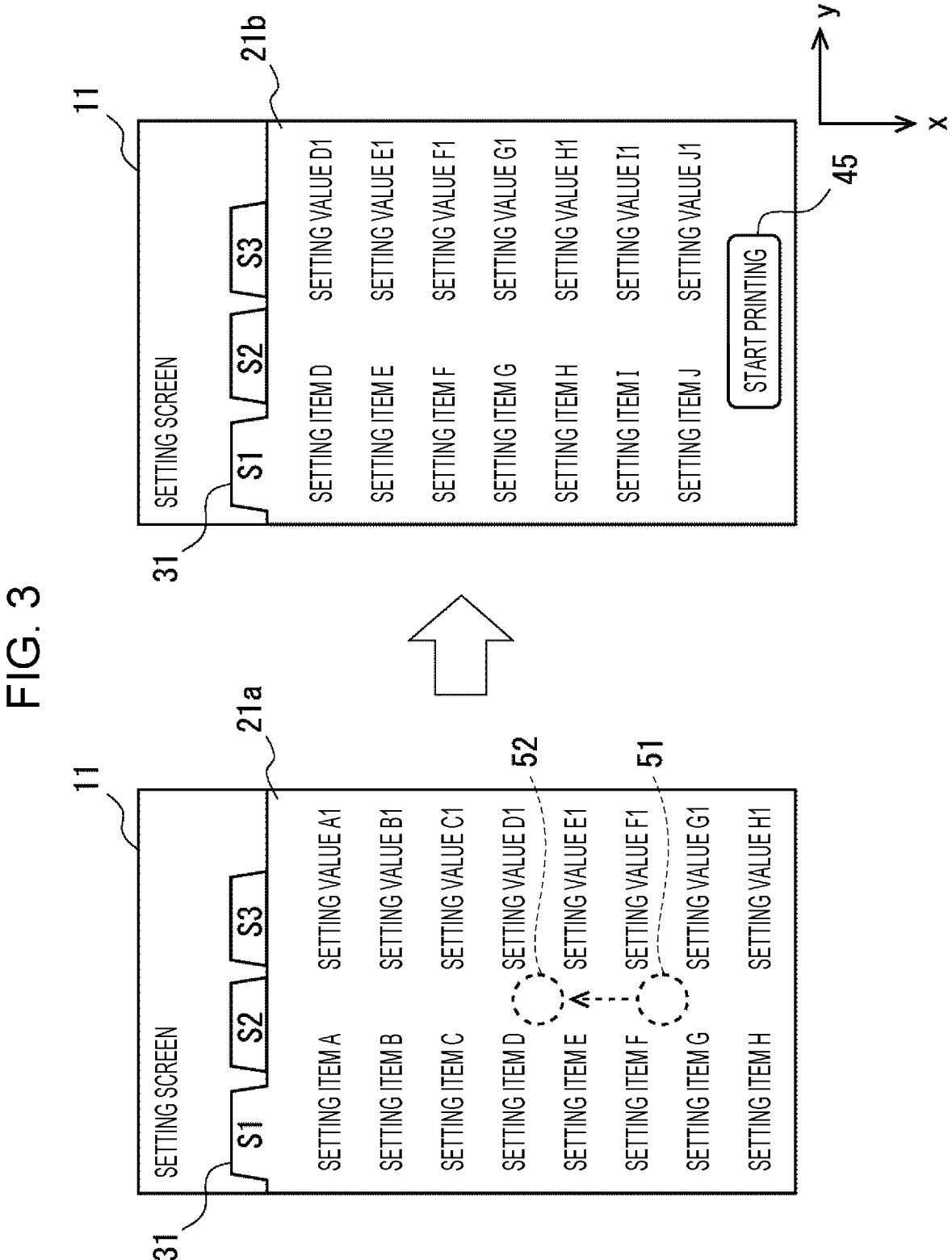
FIG. 3 is a diagram for describing an operation example of the setting screen.

Next, an operation example of the setting screen will be described in detail. As illustrated in FIG. 3, the touch panel display 11 scrolls and displays the setting set S1 in the x-axis direction in response to reception of the swipe operation made in the x-axis direction by the user. Specifically, as illustrated in FIG. 3, when the user's finger moves from a position 51 to a position 52, the touch panel display 11 detects the swipe operation made in the x-axis direction by the user, and scrolls the setting set S1 in the x-axis direction in such a way as to perform a change from a display state 21*a* illustrated on the left side of FIG. 3 to a display state 21*b* illustrated on the right side of FIG. 3.

Figure 4:
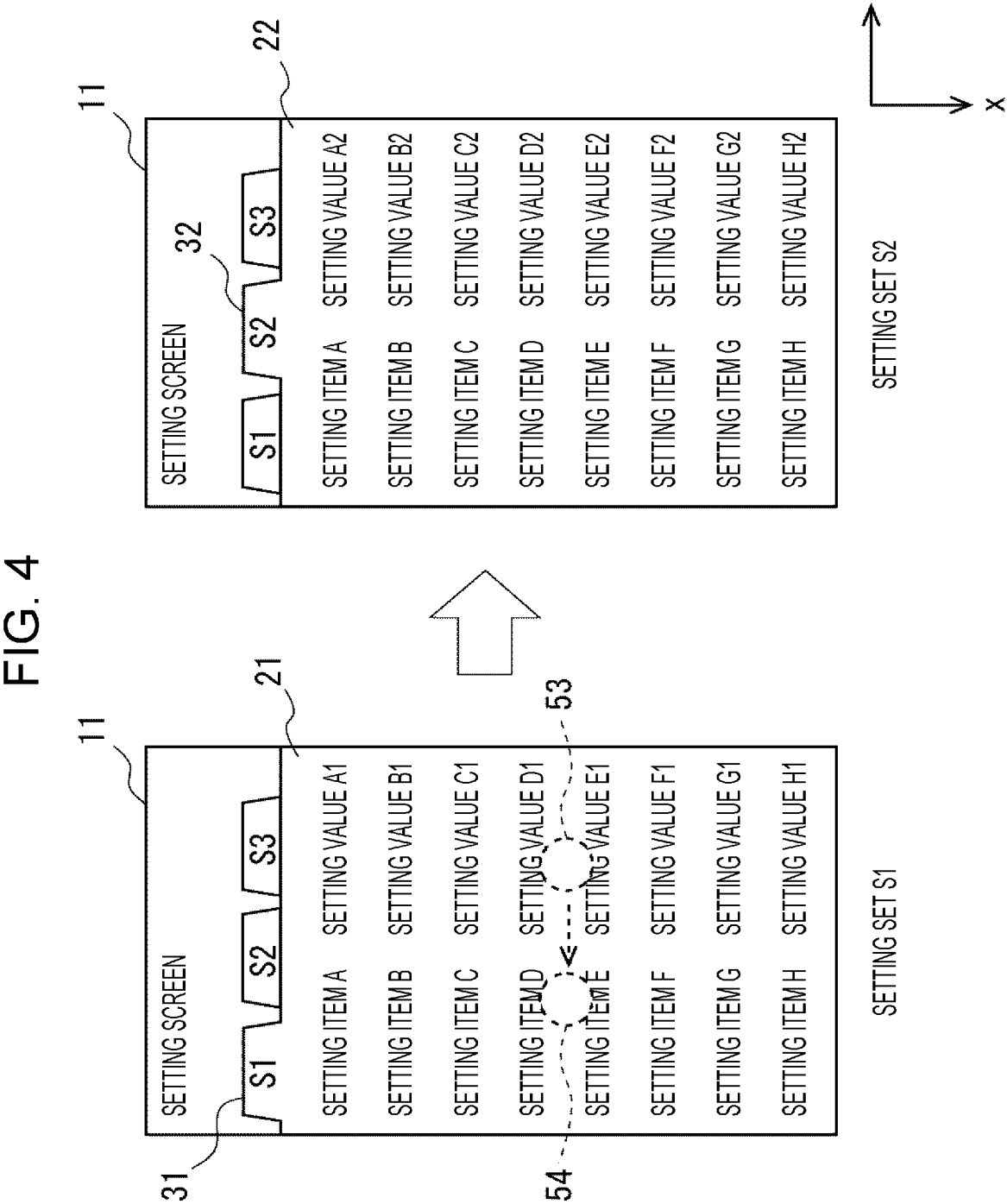
FIG. 4 is a diagram for describing an operation example of the setting screen.

As illustrated in FIG. 4, the touch panel display 11 switches the plurality of setting sets S1 to S3 in response to reception of the swipe operation made in the y-axis direction by the user. Specifically, as illustrated in FIG. 4, when the user's finger moves from a position 53 to a position 54, the touch panel display 11 detects the swipe operation made in the y-axis direction by the user, and performs switching from a state in which the setting set S1 (21) is displayed as illustrated on the left side of FIG. 4 to a state in which the setting set S2 (22) is displayed as illustrated on the right side of FIG. 4.

Figure 5:
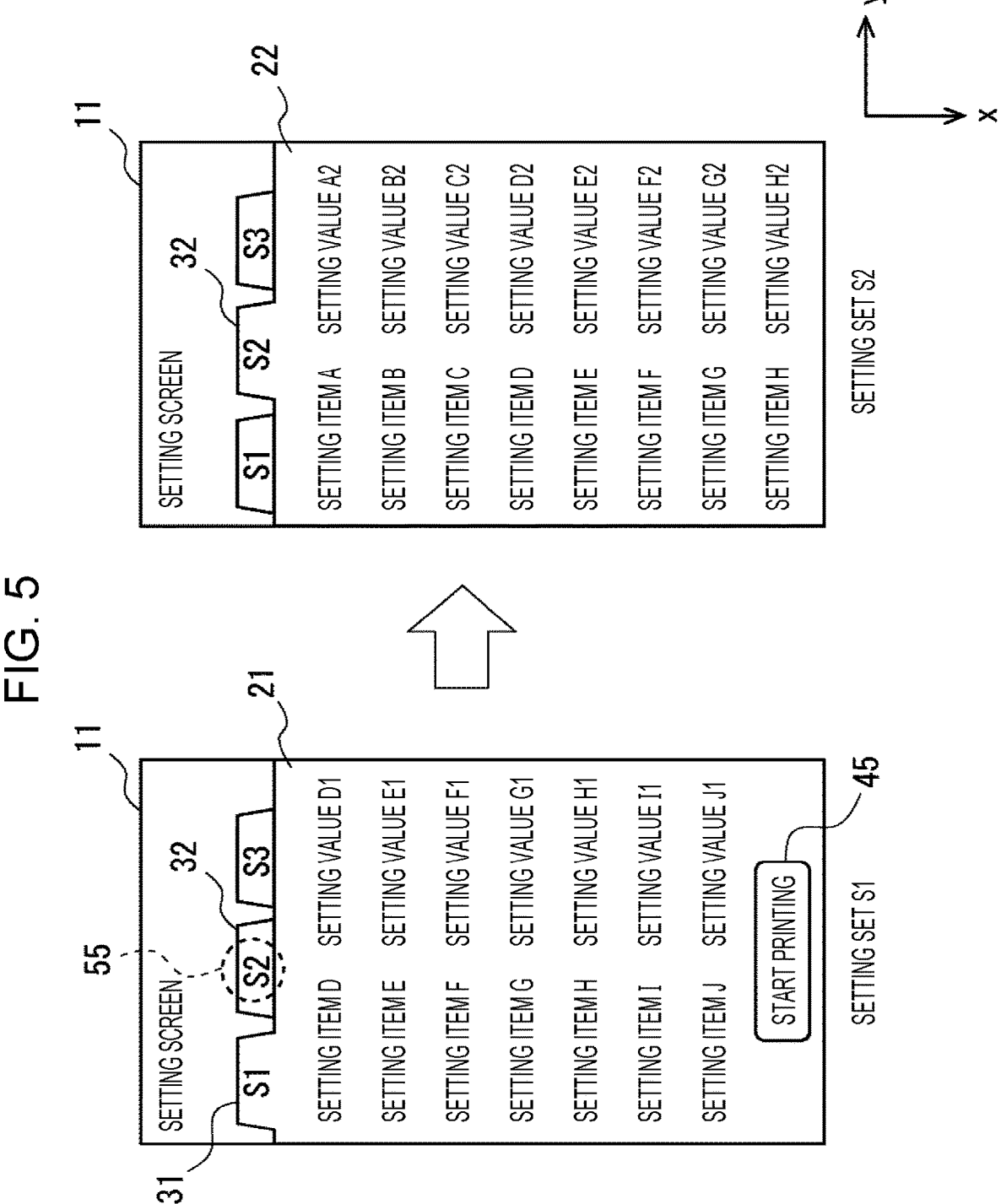
FIG. 5 is a diagram for describing an operation example of the setting screen.

Further, as illustrated in FIG. 5, the touch panel display 11 may display the tabs 31 to 33 corresponding to the respective setting sets S1 to S3, and display the setting sets S1 to S3 corresponding to the tabs 31 to 33 in response to tapping of the tabs 31 to 33. Specifically, as illustrated in FIG. 5, when it is detected that the user has tapped a position 55 of the tab 32 corresponding to the setting set S2 in a state in which the setting set S1 is displayed on the touch panel display 11, the touch panel display 11 performs switching from a state in which the setting set S1 (21) is displayed as illustrated on the left side of FIG. 5 to a state in which the setting set S2 (22) is displayed as illustrated on the right side of FIG. 5.

When the tab 32 is tapped, the touch panel display 11 may display the setting set S2 (22) corresponding to the tab 32. In this case, the touch panel display 11 may display the top of the setting set S2 (22). That is, as illustrated in FIG. 5, when the user taps the tab 32 of the setting set S2 in a state in which the scrolled setting set S1 is displayed on the touch panel display 11, that is, the middle position of the setting set S1 is displayed, the touch panel display 11 may display the top of the setting set S2 (22).

Figure 6:
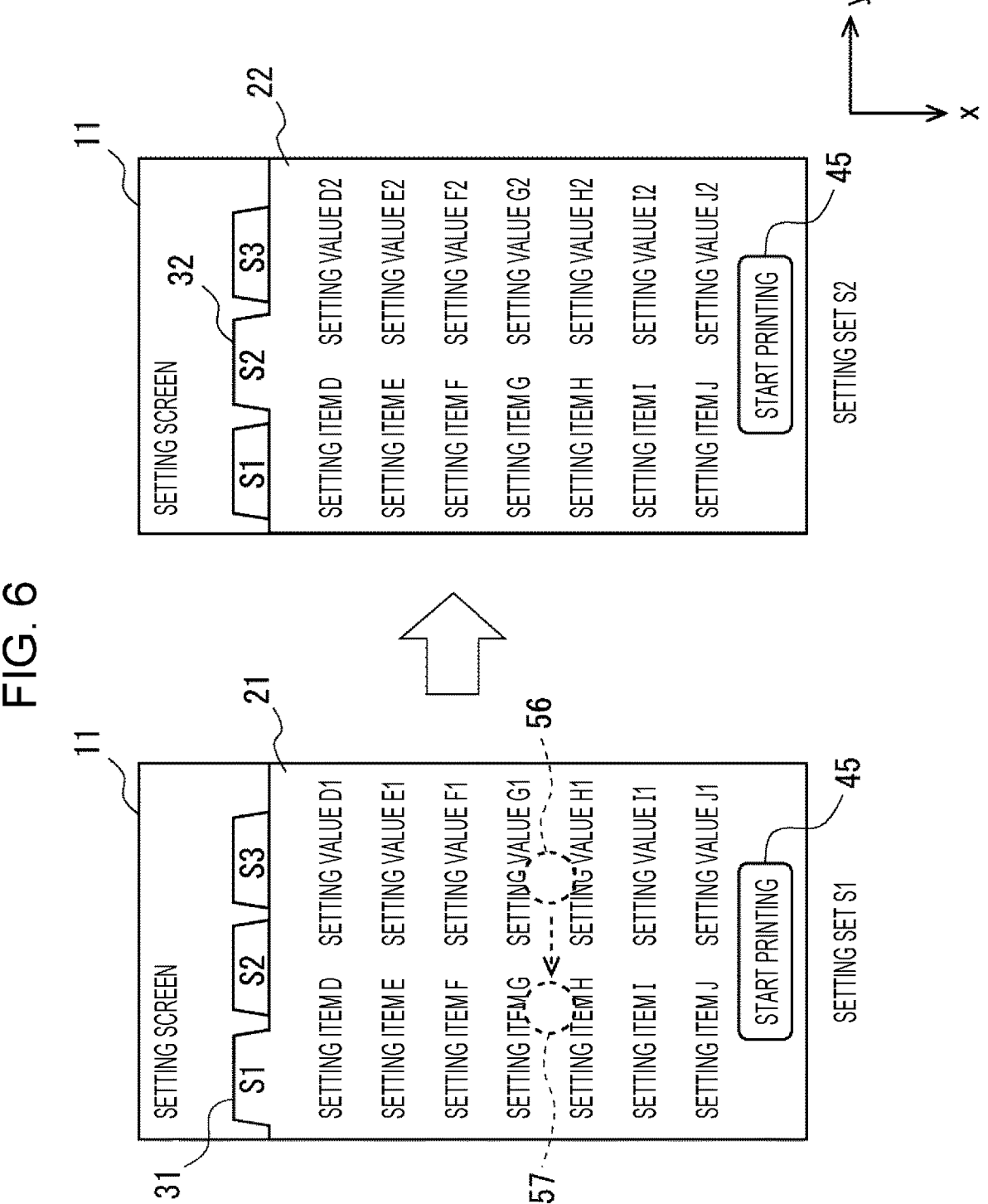
FIG. 6 is a diagram for describing an operation example of the setting screen.

As illustrated in FIG. 6, when the swipe operation in the y-axis direction is received, the touch panel display 11 performs switching from the currently displayed setting set S1 (21) to the setting set S2 (22) positioned in a direction corresponding to the swipe operation. Specifically, as illustrated in FIG. 6, when the user's finger moves from a position 56 to a position 57, the touch panel display 11 detects the swipe operation made in the y-axis direction by the user, and performs switching from a state in which the setting set S1 (21) is displayed as illustrated on the left side of FIG. 6 to a state in which the setting set S2 (22) is displayed as illustrated on the right side of FIG. 6.

In this case, the touch panel display 11 may display a scroll position corresponding to a scroll position of the setting set S1 (21) in the x-axis direction when displaying the setting set S2 (22). That is, as illustrated in FIG. 6, when displaying the setting set S2 (22), the touch panel display 11 may display the same setting items D to J as those displayed in the setting set S1 (21), and setting values D2 to J2 corresponding to the setting items D to J.

In the printing system 1 according to the present embodiment, the printing mechanism 12 performs printing based on a setting set displayed on the touch panel display 11 when a printing start instruction is received from the user. For example, as illustrated in FIG. 6, the touch panel display 11 may display a printing start button 45 below the setting set S1 in the x-axis direction. The printing mechanism 12 may receive a printing instruction when the printing start button 45 is tapped.

In the present embodiment, the touch panel display 11 may receive the swipe operation in the x-axis direction with priority over the swipe operation in the y-axis direction. For example, an operation in the y-axis direction is not received during a scroll operation in the x-axis direction, and a scroll operation in the x-axis direction may be received during a scroll operation in the y-axis direction. Different thresholds may be set for recognizing swipe operations as scroll operations in respective directions, so that the swipe operation in the x-axis direction may be received as a scroll operation even when the size or speed is small or low, and the swipe operation in the y-axis direction is not received as a scroll operation unless the size or speed is large or high.

For example, the touch panel display 11 acquires information regarding displacement of a contact position of the finger of the user, and when an x-axis component of a displacement speed is equal to or exceeds a y-axis component (Condition A), the touch panel display 11 scrolls the screen in the x-axis direction that is a vertical direction. On the other hand, when the y-axis component of the displacement speed greatly exceeds the x-axis component (Condition B), the touch panel display 11 slides the screen in the y-axis direction that is a horizontal direction to perform switching among the setting sets S1 to S3.

In Condition A, the amount of scrolling in the x-axis direction is the same as the amount of x-axis displacement from a contact start position of the user's finger, and scrolling is stopped at a position where the user releases the finger. In condition B, scrolling in the x-axis direction does not occur.

In Condition B, the amount of screen displacement in the y-axis direction is the same as the amount of y-axis displacement from the contact start position of the user's finger, and when the screen slides halfway to the current screen, the entire screen automatically slides and is switched to the next setting set screen. When Condition B is switched to Condition A before switching to the next setting set screen, sliding of the current screen ends, the screen is returned to an original position thereof, and vertical scrolling from the original scroll position is continued.

Furthermore, in the present embodiment, when switching to the next setting set screen is performed by the swipe operation in the horizontal direction, a vertical scroll position of the next switched screen may be the same as that of the original screen. That is, the touch panel display 11 may set a scroll position of the setting set of the next switched screen in the x-axis direction to a position corresponding to a scroll position of the original screen in the x-axis direction. In the present embodiment, when the screen is switched by tapping a tab, the top of the next screen may be displayed without maintaining the vertical scroll position of the original screen.

Figure 7:
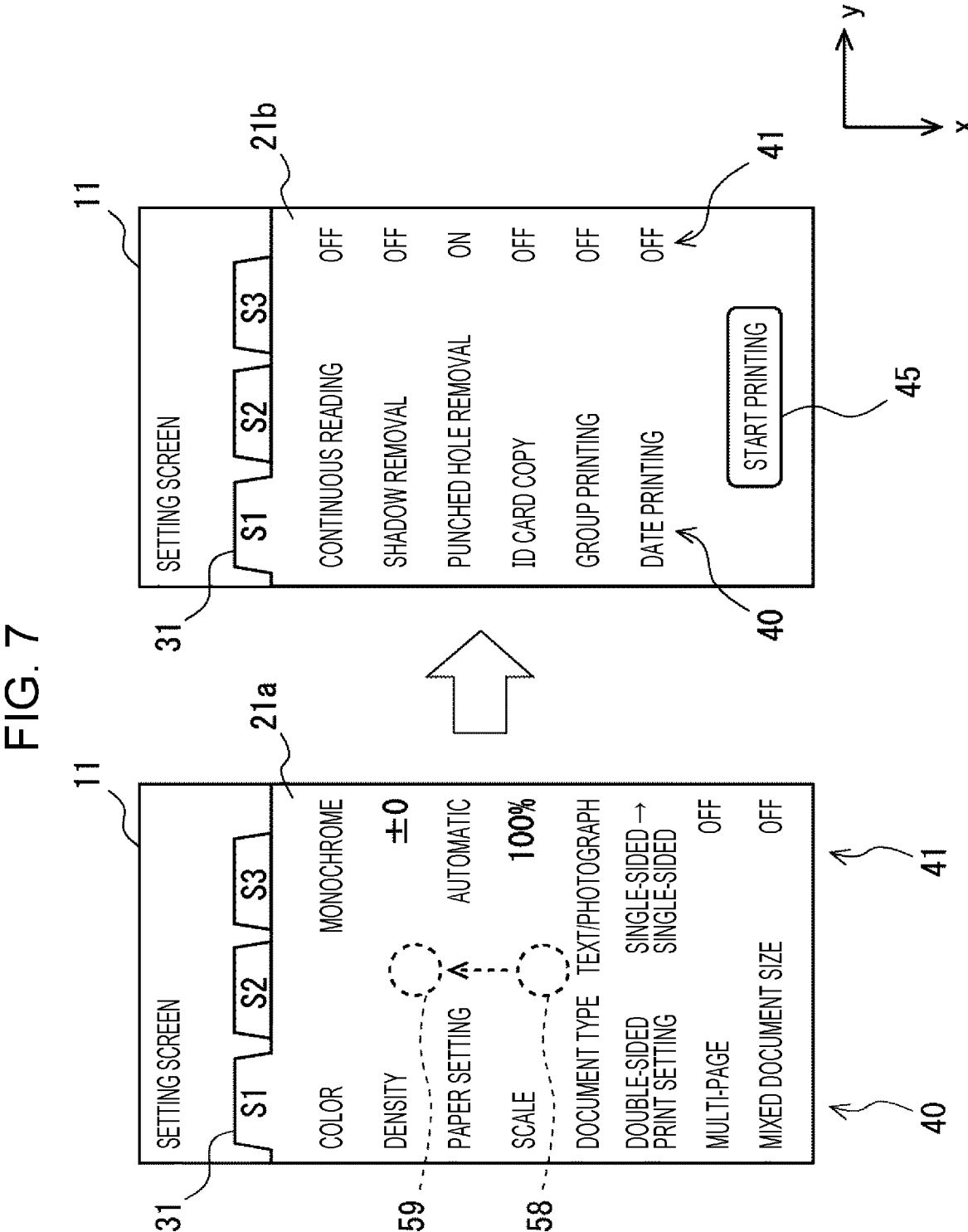
FIG. 7 is a diagram for describing an operation example of the setting screen.
Figure 8:
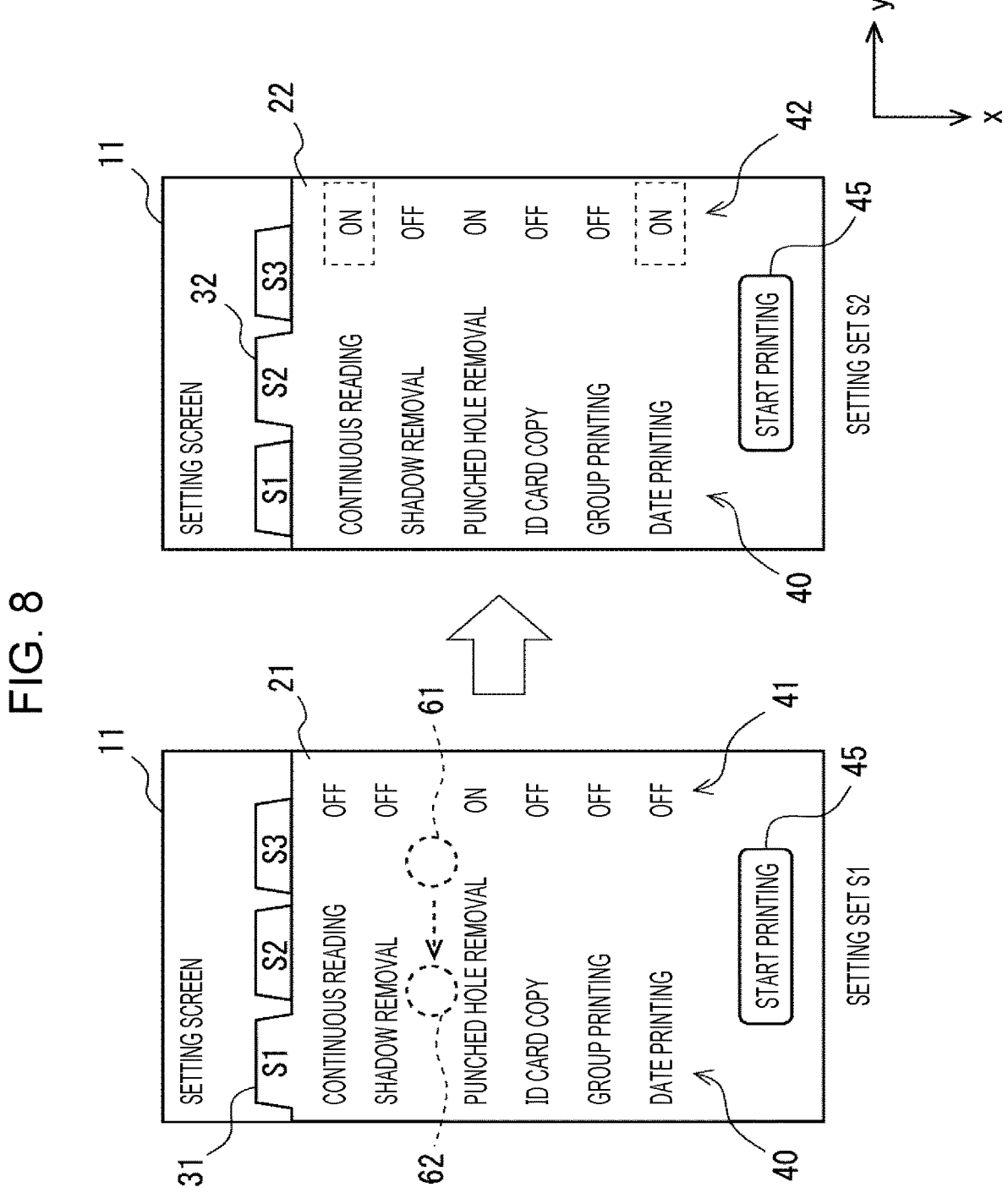
FIG. 8 is a diagram for describing an operation example of the setting screen.

Next, specific operation examples of the setting screen will be described. FIGS. 7 and 8 are diagrams for describing the operation examples of the setting screen. Color, density, paper setting, scale, document type, double-sided print setting, multi-page, mixed document size, continuous reading, shadow removal, punched hole removal, ID card copy, group printing, and date printing are provided as the setting items 40 of a setting set on the setting screen illustrated in FIGS. 7 and 8. Further, the setting values 41 corresponding to the respective setting items 40 are displayed.

As illustrated in FIG. 7, the touch panel display 11 scrolls and displays the setting set S1 in the x-axis direction in response to the swipe operation made in the x-axis direction by the user. Specifically, as illustrated in FIG. 7, when the user's finger moves from a position 58 to a position 59, the touch panel display 11 detects the swipe operation made in the x-axis direction by the user, and scrolls the setting set S1 in the x-axis direction in such a way as to perform a change from a display state 21a illustrated on the left side of FIG. 7 to a display state 21b illustrated on the right side of FIG. 7. Further, the printing start button 45 is provided below the setting set S1 in the x-axis direction, that is, at the lowermost portion in the display state 21b. When the user wants to perform printing using the settings in the setting set S1, the user taps the printing start button 45. The printing mechanism 12 receives a printing instruction when the printing start button 45 is tapped.

As illustrated in FIG. 8, when the swipe operation is made in the y-axis direction, the touch panel display 11 performs switching from the currently displayed setting set S1 (21) to the setting set S2 (22) positioned in a direction corresponding to the swipe operation. Specifically, as illustrated in FIG. 8, when the user's finger moves from a position 61 to a position 62, the touch panel display 11 detects the swipe operation made in the y-axis direction by the user, and performs switching from a state in which the setting set S1 (21) is displayed as illustrated on the left side of FIG. 8 to a state in which the setting set S2 (22) is displayed as illustrated on the right side of FIG. 8.

In this case, the touch panel display 11 may display a scroll position corresponding to a scroll position of the setting set S1 (21) in the x-axis direction when displaying the setting set S2 (22). That is, as illustrated in FIG. 8, continuous reading, shadow removal, punched hole removal, ID card copy, group printing, and date printing are displayed as the setting items 40 in the setting set S1 (21). Therefore, when displaying the setting set S2 (22), the touch panel display 11 may display the same setting items 40 as the setting items 40 displayed in the setting set S1 (21) and the setting values 42 corresponding to the setting items 40.

In the example illustrated in FIG. 8, the setting value for continuous reading in the setting set S1 (21) is "OFF", but the setting value for continuous reading in the setting set S2 (22) is "ON". Further, the setting value for date printing in the setting set S1 (21) is "OFF", but the setting value for date printing in the setting set S2 (22) is "ON".

In the present embodiment, the printing start button 45 is provided for each of the setting sets S1 to S3. Therefore, printing according to the setting set S1, S2, or S3 selected by the user is performed by tapping the printing start button 45 displayed in the setting set S1, S2, or S3 selected by the user.

As described above, in the present embodiment, different setting values can be set for the setting sets S1 to S3. Therefore, the setting values of the setting sets S1 to S3 can be determined and stored in advance according to a printing target type such as a photograph or a document. Then, the print settings can be quickly determined by selecting the setting sets S1 to S3 according to the printing target type when performing printing.

Furthermore, in the present embodiment, the plurality of setting sets S1 to S3 can be appropriately displayed according to the swipe operation made by the user, so that it is possible to prevent an operation of configuring a print setting from becoming complicated.

In the present embodiment, when switching to the next setting set screen is performed by the swipe operation in the horizontal direction, a vertical scroll position of the switched next screen may be the same as that in the original screen as illustrated in FIGS. 6 and 8. Therefore, the user can quickly configure a print setting by using the print setting screen that includes the plurality of setting sets S1 to S3.

For example, when there is a large amount of information to be displayed, such as a print setting set, a method has been adopted in which the information is divided into a plurality of pages, a tab is provided at the top of each page, and the user selects the tab to display a desired page on the screen. At this time, the user can view the page by performing an operation A of scrolling the screen in the vertical direction, an operation B of switching the screen by tapping the tab and transitioning to another page, and an operation C of scrolling the screen in the horizontal direction at a predetermined portion on the page.

Here, both the operation A and the operation C are scroll operations, but these two operations cannot be performed consecutively. In other words, in a case of some pages, there is no relevance in vertical arrangement of information, and thus, it is common to move to the top of the next page when the page changes without maintaining vertical scroll position information.

On the other hand, in a case in which the setting items 40 are common to the setting sets S1 to S3 as in the present embodiment, when setting set switching is performed by the swipe operation in the horizontal direction, the vertical scroll position is the same as that of the original screen, so that user operability is improved. Therefore, the user can quickly configure a print setting by using the print setting screen that includes the plurality of setting sets S1 to S3. The setting items 40 in the setting sets do not need to completely coincide with each other. Some setting sets may exist, and some setting sets do not have to exist. Such a situation can occur, for example, in a UI in which a setting item for long-edge binding or short-edge binding appears when double-sided printing is set. In such a case, when the setting set switching is performed by the swipe operation in the horizontal direction, the vertical scroll position information may be maintained while being adjusted to a corresponding but unmatched position information by shifting the partial setting items upward and downward.

Furthermore, in the present embodiment, the setting sets S1 to S3 can also be switched by tapping the tab instead of performing the swipe operation in the horizontal direction. When the setting sets S1 to S3 are switched by tapping the tab, the top of the setting set S1, S2, or S3 is displayed.

As described above, in the present embodiment, when the user wants to maintain the vertical scroll position of the original setting set in the next setting set to be displayed, the user performs setting set switching by using the swipe operation. Further, when the next setting set to be displayed does not need to maintain the vertical scroll position of the original setting set, that is, when the user wants to display the top of the next setting set to be displayed, the user can perform setting set switching by tapping the tab. Therefore, the user can select whether to maintain the vertical scroll position of the original setting set for the setting set to be displayed after switching or to display the top of the setting set to be displayed after switching by selectively using the swipe operation and the operation of tapping the tab.

Figure 9:
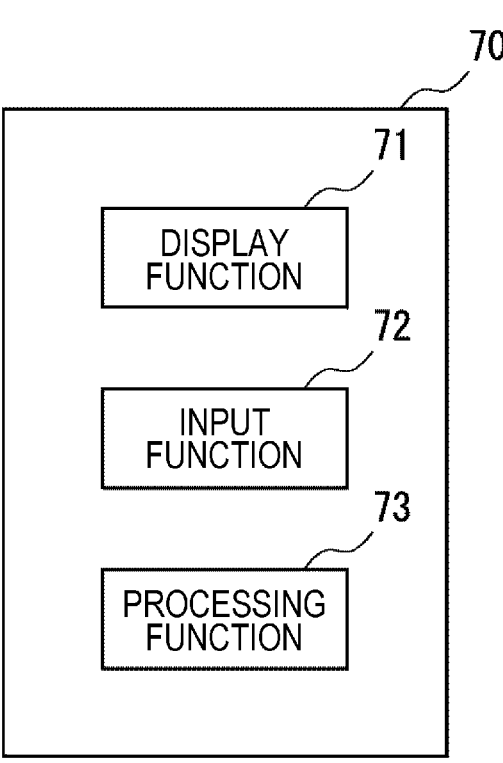
FIG. 9 is a block diagram illustrating an example of a processing system according to an embodiment.

The disclosure according to the present embodiment may be used for processing other than printing to solve the problem that the setting operation for the processing other than printing becomes complicated. FIG. 9 is a block diagram illustrating an example of a processing system according to the present embodiment. As illustrated in FIG. 9, a processing system 70 according to the present embodiment includes a display function 71 that displays an operation screen on a display device, an input function 72 that receives a user operation, and a processing function 73 that executes processing according to the operation received via the operation screen. In the present embodiment, the processing system 70 can be configured by causing a computer to execute a program for implementing these functions.

For example, the computer includes a processor and a memory. The program for configuring the processing system 70 is stored in the memory. The processor reads the program from the memory. Then, the processor can execute the program to configure the processing system 70 described above.

The display function 71 and the input function 72 included in the processing system 70 correspond to the touch panel display 11 illustrated in FIG. 1. The processing function 73 included in the processing system 70 is a device capable of executing various types of processing, and corresponds to the printing mechanism 12 illustrated in FIG. 1, for example.

In the processing system 70 according to the present embodiment, the display function 71 selectively displays, on the operation screen, a plurality of setting sets in which a plurality of setting items are arranged in the vertical direction, and setting values corresponding to the plurality of setting items are arranged at respective positions in the horizontal direction with respect to the plurality of setting items. Further, the setting set is scrolled in the vertical direction and displayed in response to reception of the swipe operation made in the vertical direction by the user. The plurality of setting sets are switched and displayed in response to reception of the swipe operation made in the horizontal direction by the user. The plurality of setting sets are switched and displayed in response to reception of the tap operation made in the horizontal direction by the user. In the processing system according to the present embodiment, the setting set is displayed on the operation screen differently depending on whether the swipe operation in the horizontal direction or the tap operation in the horizontal direction is performed.

For example, in the processing system 70 according to the present embodiment, similarly to the above-described printing system, when switching to the next setting set screen is performed by the swipe operation in the horizontal direction, the vertical scroll position of the switched next screen may be the same as that of the original screen. When the screen switching is performed by tapping the tab, the top of the next screen may be displayed without maintaining the vertical scroll position of the original screen.

Also in the processing system 70 according to the present embodiment, a plurality of setting sets can be appropriately displayed according to the swipe operation made by the user, and thus, it is possible to prevent the setting operation from becoming complicated.

Although the present disclosure has been described above with the above embodiments, the present disclosure is not limited only to the configurations of the above embodiments, and it goes without saying that the present disclosure includes various modifications, changes, and combinations that can be made by those skilled in the art within the scope of the claims of the present application.

What is claimed is:

1. A printing system comprising:
a touch panel display; and
a printing mechanism that performs printing according to a print setting configured using the touch panel display, wherein
the touch panel display is configured to selectively display a plurality of print setting sets in which a plurality of setting items are arranged in a first direction, and setting values corresponding to the plurality of setting items are arranged at respective positions in a second direction intersecting the first direction with respect to the plurality of setting items,
a print setting set of the plurality of print setting sets is scrolled in the first direction and displayed in response to reception of a swipe operation made in the first direction by a user,
the plurality of print setting sets are switched and a switched print setting set is displayed in response to reception of a swipe operation made in the second direction by the user,
the touch panel display receives the swipe operation in the first direction with priority over the swipe operation in the second direction, and
the printing mechanism performs printing based on the switched print setting set displayed on the touch panel display when a printing start instruction is received from the user.

2. The printing system according to claim 1, wherein
the touch panel display displays a printing start button on a side of the print setting set in the first direction, and
the printing mechanism receives a printing instruction when the printing start button is tapped.

3. The printing system according to claim 1, wherein
the touch panel display displays a button corresponding to each of the plurality of print setting sets and displays the print setting set corresponding to the button in response to tapping of the button.

4. The printing system according to claim 3, wherein
when the button is tapped, the touch panel display performs switching from a currently displayed first print setting set to a second print setting set corresponding to the button and displays a top of the second print setting set regardless of a scroll position of the first print setting set in the first direction when displaying the second print setting set, and
when the swipe operation in the second direction is received, the touch panel display performs switching from the currently displayed first print setting set to the second print setting set positioned in a direction corresponding to the swipe operation in the second direction and displays a scroll position corresponding to the scroll position of the first print setting set in the first direction when displaying the second print setting set.

5. The printing system according to claim 4, wherein the button is a tab.

6. The printing system according to claim 1, wherein
the first direction is a longitudinal direction of the touch panel display, and
the second direction is a lateral direction of the touch panel display.

7. A printed matter production method of producing printed matter by performing printing according to a print setting configured using a touch panel display, the printed matter production method comprising:
selectively displaying, on the touch panel display, a plurality of print setting sets in which a plurality of setting items are arranged in a first direction, and setting values corresponding to the plurality of setting items are arranged at respective positions in a second direction intersecting the first direction with respect to the plurality of setting items;
scrolling a print setting set of the plurality of print setting sets in the first direction and displaying the scrolled print setting set on the touch panel display in response to reception of a swipe operation made in the first direction by a user;
switching the plurality of print setting sets and displaying a switched print setting set on the touch panel display in response to reception of a swipe operation made in the second direction by the user;
receiving, on the touch panel display, the swipe operation in the first direction with priority over the swipe operation in the second direction; and
causing a printing mechanism to perform printing based on the switched print setting set displayed on the touch panel display when a printing start instruction is received from the user to produce the printed matter.

8. A non-transitory computer-readable storage medium storing a program for causing a computer to implement:
a display function that displays an operation screen on a display device;
an input function that receives a user operation; and
a processing function that executes processing according to an operation received via the operation screen, wherein
a plurality of setting sets in which a plurality of setting items are arranged in a first direction, and setting values corresponding to the plurality of setting items are arranged at respective positions in a second direction intersecting the first direction with respect to the plurality of setting items are selectively displayed on the operation screen, a setting set of the plurality of setting sets is scrolled in the first direction and displayed in response to reception of a swipe operation made in the first direction by a user, the plurality of setting sets are switched and a switched setting set is displayed in response to reception of a swipe operation made in the second direction by the user, the operation screen receives the swipe operation in the first direction with priority over the swipe operation in the second direction, the plurality of setting sets are switched and the switched setting set is displayed in response to reception of a tap operation made in the second direction by the user, and the setting set displayed on the operation screen is displayed differently depending on whether the swipe operation in the second direction or the tap operation in the second direction is performed.

* * * * *